US012583202B2

(12) United States Patent
Taylor et al.

(10) Patent No.: US 12,583,202 B2
(45) Date of Patent: Mar. 24, 2026

(54) METHODS FOR FORMING CUSHIONING ELEMENTS ON FABRIC

(71) Applicant: Purple Innovation, LLC, Lehi, UT (US)

(72) Inventors: Robert Wayne Taylor, Highland, UT (US); Russell B. Whatcott, Eagle Mountain, UT (US); Matthew Eccles Rogers, Eagle Mountain, UT (US); Dhyey Y. Acharya, Lehi, UT (US); Lidia Saldaña, West Valley, UT (US)

(73) Assignee: Purple Innovation, LLC, Lehi, UT (US)

( * ) Notice: Subject to any disclaimer, the term of this patent is extended or adjusted under 35 U.S.C. 154(b) by 0 days.

(21) Appl. No.: 18/222,835

(22) Filed: Jul. 17, 2023

(65) Prior Publication Data

US 2023/0356497 A1     Nov. 9, 2023

Related U.S. Application Data

(60) Division of application No. 18/096,517, filed on Jan. 12, 2023, now Pat. No. 12,350,919, which is a
(Continued)

(51) Int. Cl.
*B32B 5/06*       (2006.01)
*A47G 9/10*       (2006.01)
(Continued)

(52) U.S. Cl.
CPC ................. *B32B 5/06* (2013.01); *A47G 9/10* (2013.01); *B29C 70/865* (2013.01); *B32B 3/12* (2013.01);
(Continued)

(58) Field of Classification Search
CPC .... B32B 5/06; B32B 5/24; B32B 5/26; B32B 5/18; B32B 5/245; A47G 9/10; B29K 2021/00; B29C 70/865
See application file for complete search history.

(56) References Cited

U.S. PATENT DOCUMENTS 3,148,389 A    9/1964   Lustig
4,316,298 A    2/1982   Russo et al.
(Continued)

FOREIGN PATENT DOCUMENTS

CN      102639324 A    8/2012
CN      205767139 U   *   12/2016
(Continued)

OTHER PUBLICATIONS

English Translation of CN-205767139-U retreived from Espacenet. (Year: 2024).*
(Continued)

*Primary Examiner* — Abbas Rashid
*Assistant Examiner* — Elisa H Vera
(74) *Attorney, Agent, or Firm* — Foley & Lardner LLP

(57) ABSTRACT

A method for forming a cushioning element comprises molding a first cushioning element on a first side of a fabric and molding a second cushioning element on a second side of the fabric. The first cushioning element and second cushioning element may be superimposed. The fabric may include a first layer and a second layer that are superimposed, with the first cushioning element secured to and protruding from the first layer and the second cushioning element secured to and protruding from the second layer. Each of the first cushioning element and second cushioning element may include a plurality of interconnected walls
(Continued)

formed from an elastomeric gel material. The walls of the first cushioning element and second cushioning element may be aligned or offset.

22 Claims, 8 Drawing Sheets

Related U.S. Application Data continuation of application No. 16/901,783, filed on Jun. 15, 2020.

(60) Provisional application No. 62/861,138, filed on Jun. 13, 2019.

(51) Int. Cl.
| | | |
|---|---|---|
| *B29C 70/86* | (2006.01) | |
| *B29K 21/00* | (2006.01) | |
| *B29K 105/08* | (2006.01) | |
| *B29K 311/10* | (2006.01) | |
| *B29L 31/00* | (2006.01) | |
| *B32B 3/12* | (2006.01) | |
| *B32B 5/24* | (2006.01) | |

(52) U.S. Cl.
CPC ............... *B32B 5/073* (2021.05); *B32B 5/24* (2013.01); *B29K 2021/00* (2013.01); *B29K 2105/0809* (2013.01); *B29K 2311/10* (2013.01); *B29L 2031/751* (2013.01); *B32B 2479/00* (2013.01)

(56) References Cited

U.S. PATENT DOCUMENTS

| | | | |
|---|---|---|---|
| 4,718,153 A | | 1/1988 | Armitage et al. |
| 4,753,705 A | | 6/1988 | Poncy |
| 4,857,370 A | * | 8/1989 | Overbergh .......... B29C 61/0633 |
| | | | 442/232 |
| 4,921,756 A | | 5/1990 | Tolbert et al. |
| 4,988,282 A | | 1/1991 | Fukui |
| 5,039,567 A | * | 8/1991 | Landi ................. B29C 66/1122 |
| | | | 428/116 |
| D372,158 S | | 7/1996 | Bonaddio et al. |
| 5,617,595 A | * | 4/1997 | Landi .................... E01F 8/0076 |
| | | | 428/116 |
| 5,701,621 A | | 12/1997 | Landi et al. |
| 5,749,111 A | | 5/1998 | Pearce |
| 5,994,450 A | | 11/1999 | Pearce |
| 6,026,527 A | | 2/2000 | Pearce |
| 6,797,765 B2 | | 9/2004 | Pearce |
| 7,964,664 B2 | | 6/2011 | Pearce |
| 8,448,273 B2 | | 5/2013 | Walker et al. |
| 8,919,750 B2 | | 12/2014 | Pearce et al. |
| D732,311 S | | 6/2015 | Lord |
| D752,292 S | | 3/2016 | Columbus |
| 9,314,118 B2 | | 4/2016 | Blazar et al. |
| D839,025 S | | 1/2019 | Casta-Báez |
| D917,206 S | | 4/2021 | Taylor et al. |
| D917,927 S | | 5/2021 | Taylor et al. |
| D959,176 S | | 8/2022 | Woodard et al. |
| D961,089 S | | 8/2022 | Szparski |
| 2004/0019972 A1 | | 2/2004 | Schecter et al. |
| 2005/0060806 A1 | | 3/2005 | Wilkinson |
| 2006/0253988 A1 | * | 11/2006 | Pearce .................... B29C 48/11 |
| | | | 5/655.5 |
| 2008/0261046 A1 | * | 10/2008 | Husler .................... B29C 70/44 |
| | | | 425/405.2 |
| 2008/0271250 A1 | | 11/2008 | Poppe |
| 2009/0222995 A1 | | 9/2009 | Perry et al. |
| 2012/0244324 A1 | | 9/2012 | Chen |
| 2013/0019409 A1 | | 1/2013 | Blazar et al. |
| 2014/0082846 A1 | | 3/2014 | Blazar |

| | | | |
|---|---|---|---|
| 2014/0096323 A1 | | 4/2014 | Alletto |
| 2014/0283304 A1 | | 9/2014 | Chambers |
| 2016/0235619 A1 | | 8/2016 | Yeh |
| 2017/0174346 A1 | | 6/2017 | Wilson et al. |
| 2018/0014667 A1 | | 1/2018 | Ibrahim |
| 2018/0199738 A1 | | 7/2018 | Klein |
| 2018/0305199 A1 | | 10/2018 | Pearce et al. |

FOREIGN PATENT DOCUMENTS

| | | |
|---|---|---|
| JP | H04221516 A | 8/1992 |
| KR | 1020050045819 A | 5/2005 |
| WO | 2015186009 A1 | 12/2015 |

OTHER PUBLICATIONS

AllSett Health Round Roll Pillow, posted May 12, 2020 [online], [retrieved Jan. 10, 2023]. Retrieved from internet, https://www.amazon.com/Cervical-Cylinder-Removable-Washable-Ergonmically/dp/B088JB1FWX (2020).

Canadian Intellectual Property Office, "Examiner's Requisition," Canadian Application No. 3,128,523, Jun. 22, 2023.

Canadian Intellectual Property Office, "Examiner's Requisition," Canadian Application No. 3,128,523, Nov. 7, 2022.

China National Intellectual Property Administration, "First Office Action," Chinese Application No. 202080019730.X, Apr. 22, 2022.

China National Intellectual Property Administration, "Second Office Action," Chinese Application No. 202080019730.X. Jan. 28, 2023.

China National Intellectual Property Administration, "Third Office Action," Chinese Application No. 202080019730.X, Jun. 16, 2023.

China National Intellectual Property Administration, "Notice of Decision on Rejection," Chinese Application No. 202080019730.X, Sep. 29, 2023.

China National Intellectual Property Administration, "Office Action," Chinese Application No. 202130687560.X (May 16, 2023).

Definition of fixed, https://www.oed.com/dictionary/fixed_adj?tl=true, accessed May 2, 2024.

DYNMC Neck Bolster Pillow Roll, posted Feb. 2017, 21 [online], [retrieved Jan. 10, 2023]. Retrieved from internet, https://www.amazon.com/Bolster-Pillow-Bamboo-Oeko-TEX-Cover/dp/B08KH7GXGP?th=1 (Year: 2021).

English translation of CN 205767139 U retrieved from Espacenet (Year: 2024).

European Patent Office, "Communication Pursuant to Article 94(3) EPC," European Application No. 20822637.3, Jul. 10, 2023.

European Patent Office, "Extended European Search Report," European Application No. 20822637.3, Aug. 2, 2022.

Intellectual Property India, "First Examination Report," Indian Application No. 202117060606, Jun. 30, 2022.

Intellectual Property India, "Opposition," Indian Application No. 202117060606, Sep. 5, 2023.

IP Australia, "Examination Report No. 1," Australian Application No. 2020294103, Feb. 6, 2023.

IP Australia, "Notice of Acceptance," Australian Patent Application No. 2020294103, Feb. 9, 2024.

Japan Patent Office, "Office Action," Japanese Application No. 2021-573767, May 2, 2023.

Japan Patent Office, "Office Action," Japanese Application No. 2021-573767, Sep. 16, 2022.

Korean Intellectual Property Office, "Notice of Final Rejection," Korean Application No. 10-2022-7001143, Feb. 29, 2024.

Korean Intellectual Property Office, "Notice of Allowance," Korean Application No. 30-2021-0049532 (May 15, 2023).

Korean Intellectual Property Office, "Notice of Preliminary Rejection," Korean Application No. 10-2022-7001143, Apr. 30, 2023.

Korean Intellectual Property Office, "Notice of Preliminary Rejection," Korean Application No. 30-2021-0049532, Jan. 20, 2023.

Merriam-Webster.com/dictionary/array accessed Feb. 14, 2023.

Purple Harmony Pillow, https://purple.com/pillows/harmony, Oct. 23, 2019.

The Sleep Company Smart Grid Hybrid Premium Pillow. Order No. 5059, Invoice No. TSC036, Sep. 4, 2019.

(56) References Cited

OTHER PUBLICATIONS

USPTO as International Searching Authority, "International Search Report and Written Opinion," International Application No. PCT/US2020/03777, Aug. 11, 2020.
European Patent Office, "Communication Pursuant to Article 94(3) EPC," European Application No. 20822637.3, May 17, 2024.
Order of the Controller Regarding Pre-Grant Opposition on IN 202117060606 May 1, 2025.
The Sleep Company Smart Grid Hybrid Premium Pillow.

* cited by examiner

METHODS FOR FORMING CUSHIONING ELEMENTS ON FABRIC

CROSS-REFERENCE TO RELATED APPLICATION

This application is a divisional of U.S. patent application Ser. No. 18/096,517, filed on Jan. 12, 2023 and titled SECONDARY CUSHIONING ELEMENTS FOR CUSH-ION ("the '517 Application"). The '517 Application is a continuation of U.S. patent application Ser. No. 16/901,783, filed on Jun. 15, 2020 and titled CUSHIONED COVERS FOR CUSHIONS ("the '783 Application"). A claim for priority to the Jun. 13, 2019 filing date of U.S. Provisional Patent Application No. 62/861,138, titled PILLOWS AND COVERS ("the '138 Provisional Application") was made in the '783 Application. The entire disclosures of the '517 Application, the '783 Application, and the '138 Provisional Application are hereby incorporated herein.

TECHNICAL FIELD

This disclosure relates generally covers for pillows or other primary cushioning elements and, more specifically, to covers with panels that include secondary cushioning ele-ments. Even more specifically, this disclosure relates to a cover with a central pocket that receives a cushioning element, such as a pillow or a pillow insert, between a pair of secondary cushioning elements of the cover. This disclo-sure also relates to cushion, such as a pillow, that includes such a cover, as well as to methods of manufacturing and using covers for pillows or other primary cushioning ele-ments.

SUMMARY

A cover according to this disclosure may have a configu-ration that enables it to receive a primary cushioning ele-ment, such as a pillow insert or a pillow. The cover may include a first panel that carries a secondary cushioning element, a second panel, and a primary receptacle, or a pocket, defined between the first panel and the second panel. The pocket may receive the primary cushioning element. In some embodiments, the second panel may also carry a secondary cushioning element.

The secondary cushioning element of the first panel may comprise any suitable type of cushioning element. In a specific embodiment, the secondary cushioning element may comprise a compressible, resilient elastomeric material that defines a plurality of thin interconnected walls defining an array of cells or columns. Even more specifically, the compressible, resilient elastomeric material may define a plurality of thin walls that in turn define an array of hexagonal cells in a so-called "honeycomb" arrangement. Such a secondary cushioning element may be secured to (e.g., formed on, bonded to, adhered to, etc.) part of the first panel.

The first panel may include an outer layer and an inner layer, with a secondary receptacle defined therebetween. In some embodiments, peripheral edges of the inner layer may be secured to an inner surface of the outer layer and/or to peripheral edges of the outer layer. The inner layer may be secured directly to the outer layer. Alternatively, the inner layer may be secured to an inner edge of a gusset, whose outer edge is in turn secured to the outer layer, with the gusset spacing the inner layer and the outer layer apart from one another. The secondary receptacle between the inner layer and the outer layer may receive, or carry, the secondary cushioning element. In some embodiments, the secondary cushioning element may be secured to one or both of the outer layer and the inner layer of the first panel. The secondary cushioning element may be permanently secured within the secondary receptacle in a manner that preventing access to the secondary cushioning element.

In embodiments where the second panel includes a sec-ondary cushioning element, the secondary cushioning ele-ment of the second panel may also comprise any suitable type of cushioning element, including without limitation, a cushioning element in which a compressible, resilient elas-tomeric material defines a plurality of thin interconnected walls that in turn define an array of cells or columns. In such an embodiment, the second panel may also include an outer layer and an inner layer, and a secondary receptacle defined between the outer layer and the inner layer. In such embodi-ments, peripheral edges of the inner layer may be secured to an inner surface of the outer layer and/or to peripheral edges of the outer layer. The inner layer may be secured directly to the outer layer. Alternatively, the inner layer may be secured to an inner edge of a gusset, whose outer edge is in turn secured to the outer layer, with the gusset spacing the inner layer and the outer layer apart from one another. The secondary receptacle between the inner layer and the outer layer may receive, or carry, the secondary cushioning ele-ment of the second panel. That secondary cushioning ele-ment of the second panel may be to one or both of the outer layer and the inner layer of the second panel. The secondary cushioning element may be permanently secured within the secondary receptacle, preventing access to the secondary cushioning element.

Peripheral edges of the first panel and the second panel of the cover may be secured to each other in a manner that defines the primary receptacle between the first panel and the second panel. In some embodiments, portions of the peripheral edges of the first panel and the second panel that are inseparably secured to one another may be secured directly to one another. In other embodiments, the portions of the peripheral edges of the first panel and the second panel that are inseparably secured to one another may be indirectly secured to one another. As an example, peripheral edges of the first panel (e.g., a top panel, etc.) of the cover may be secured to a first edge (e.g., a top edge, etc.) of a gusset and peripheral edges of the second panel (e.g., a bottom panel, etc.) of the cover may be secured to a second edge (e.g., a bottom edge, etc.) of the gusset, with the gusset defining the periphery of the cover and, thus, being referred to herein as a "peripheral gusset." In embodiments where the first panel includes an outer layer and an inner layer and the second panel includes an outer layer and an inner layer, the inner layers of the first panel and the second panel may at least partially define the primary receptacle. In embodiments where the cover further includes a peripheral gusset, the peripheral gusset may also define part of the primary recep-tacle.

The cover may also include a primary opening, which provides access to the primary receptacle. The primary opening may be defined by edges of the cover that may be separated from each other. For example, portions of the edges that define the primary opening may be separated from on another to open the primary opening and provide access to the primary receptacle of the cover. As another example, a zipper between portions of the edges that define the primary opening may be selectively unzipped to open the primary opening to the primary receptacle. In yet another example, buttons or other fasteners that secure portions of the edges that define the primary opening to each other may be unbuttoned or otherwise unfastened to open the primary opening and provide access to the primary receptacle.

With the primary opening of the cover open, the primary receptacle can receive a primary cushioning element. More specifically, the primary opening of the cover may facilitate introduction (and removal) of a primary cushioning element, such as fill for a pillow, a pillow insert, a pillow, or the like, into (or out of) the primary receptacle. The primary receptacle may receive the primary cushioning element in such a way that each secondary cushioning element at least partially, or even entirely, covers a corresponding surface of the primary cushioning element.

In another aspect, a cushion, such as a pillow, that includes a cover according to this disclosure, as well as a cushioning element within an interior of the cover, is disclosed.

Methods for enhancing the cushioning of a cushioning element are also disclosed. A primary cushioning element, such as fill for a pillow, a pillow insert, an existing pillow, or the like, may be introduced into a primary receptacle of a cover that includes a secondary cushioning element in one or both panels (i.e., major surfaces) thereof. Upon introducing the primary cushioning element into the primary receptacle, each secondary cushioning element of the cover may be at least partially superimposed with the pillow or fill. The resulting cushion may then be used to support a body part (e.g., an individual's head, back, legs, etc.). Superimposition of the secondary cushioning element over at least a portion of the primary cushioning element may alter or enhance the manner in which the primary cushioning element cushions the body part.

Other aspects of the disclosed subject matter, as well as features and advantages of various aspects of the disclosed subject matter, will become apparent to those of ordinary skill in the art through consideration of the ensuing disclosure, the accompanying drawings, and the appended claims.

DETAILED DESCRIPTION

Figure 1:
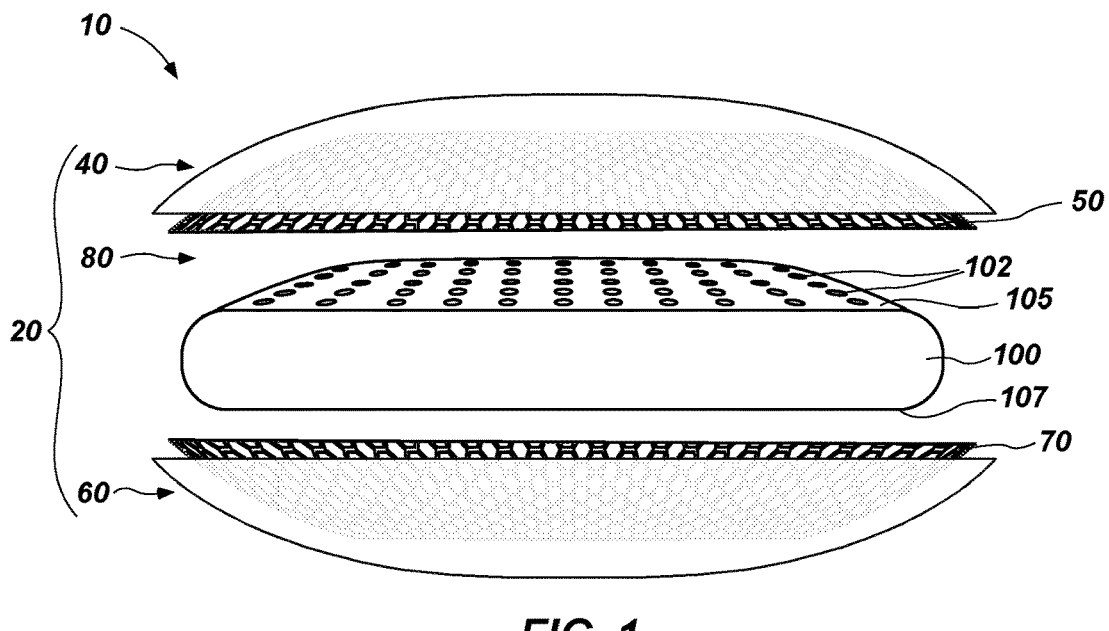
FIG. 1 is an exploded perspective view of an embodiment of a cushion and cover of the cushion according to this disclosure, in which the cover includes a first panel that carries a secondary cushioning element and a second panel that carries a secondary cushioning element, and a primary cushioning element may be placed between the first panel and the second panel.
Figure 1A:
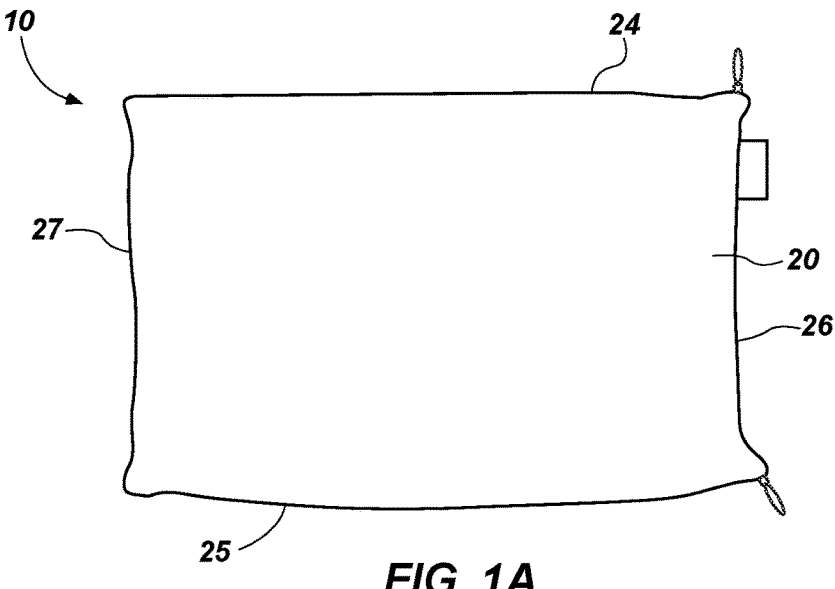
FIG. 1A provides a top view of the cushion and cover shown in FIG. 1.
Figure 1B:
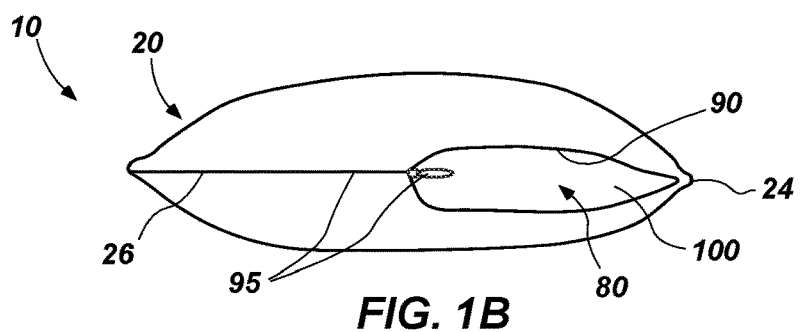
FIG. 1B depicts the cushion and cover shown in FIG. 1 from a side thereof.

With reference to FIGS. 1, 1A, and 1B, an embodiment of a cushion 10 according to this disclosure is shown. The cushion 10 may comprise a pillow or any other type of cushion. The cushion 10 includes a cover 20 with a first panel 40, a second panel 60, and a primary receptacle 80 between the first panel 40 and the second panel 60. The first panel 40 and the second panel 60 may comprise opposite sides (e.g., a top and a bottom, etc.) of the cover 20. The primary receptacle 80 and may also be referred to herein as a "pocket" and is configured to receive a primary cushioning element 100.

The first panel 40 may carry or otherwise include a secondary cushioning element 50. The second panel 60 may also carry or otherwise include a secondary cushioning element 70. Each secondary cushioning element 50, 70 may comprise any suitable cushioning material. The secondary cushioning elements 50 and 70 may be relatively thin. In various embodiments, the secondary cushioning elements 50 and 70 may have maximum thickness and a minimum thickness wherein the maximum thickness may be towards a center 56, 76 (FIG. 3) of the secondary cushioning element 50, 70 and a minimum thickness may be towards an outer periphery 58, 78 of the secondary cushioning element 50, 70.

As a non-limiting example, each secondary cushioning element 50, 70 may comprise a compressible, resilient, elastomeric material (e.g., the materials described by U.S.

Figure 3:
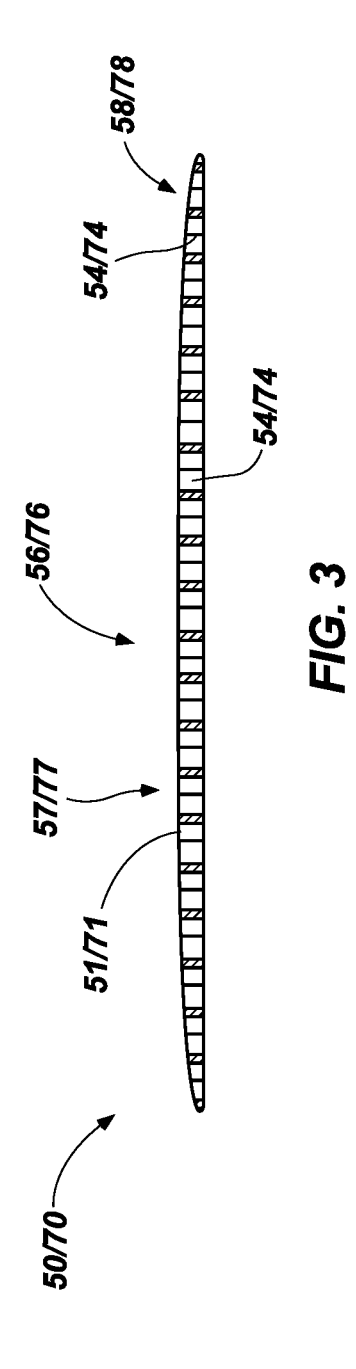
FIG. 3 is a cross-sectional representation of an embodiment of a secondary cushioning element of a panel of the variation of cover shown in FIG. 2, showing that the secondary cushioning element is thicker at its center than at its outer periphery.
Figures 3A, 4:
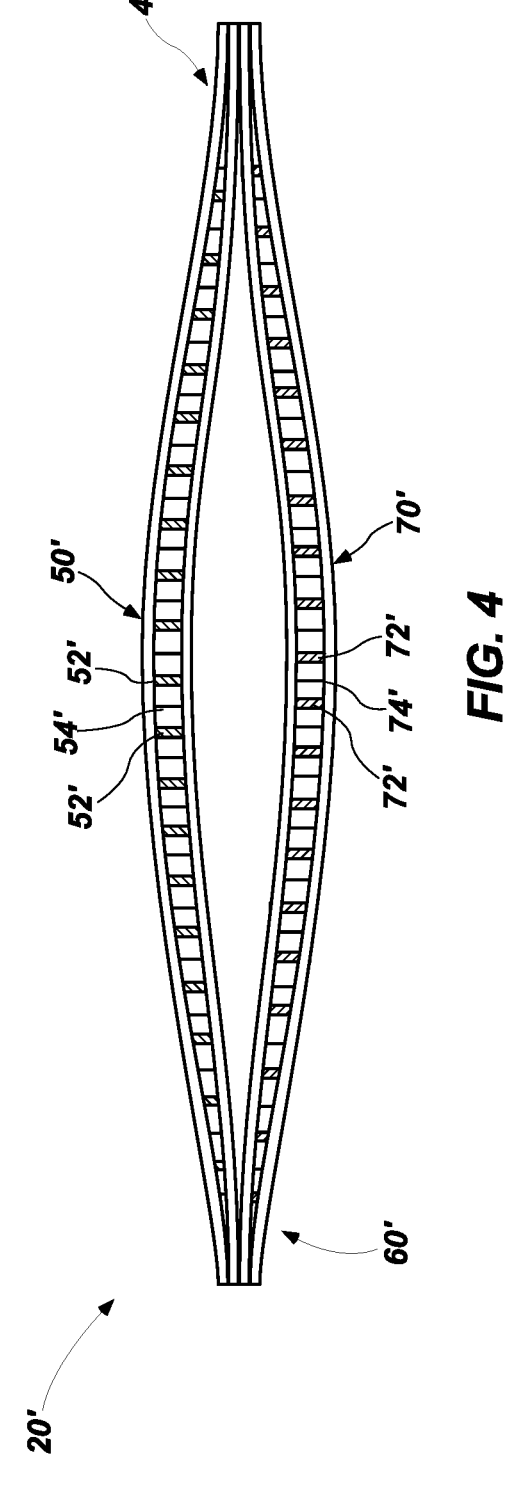
FIG. 3A shows an embodiment of surface of the embodiment secondary cushioning element shown in FIG. 3.
FIG. 4 is a cross-sectional representation of another variation of the cover of FIG. 1, in which secondary cushioning elements of a first panel of the cover and a second panel of the cover are in substantial alignment with one another.

Pat. Nos. 5,994,450, 6,797,765, and 7,964,664, the entire disclosures of which are hereby incorporated herein by reference, etc.) that defines a plurality of thin interconnected walls 52, 72 that in turn define an array of cells or columns 54, 74 (e.g., the cushioning elements described by U.S. Pat. Nos. 5,749,111 and 6,026,527, the entire disclosures of which are hereby incorporated herein, etc.). The cells or columns 54, 74 of each secondary cushioning element 50, 70 may be hexagonal in shape, as illustrated by FIGS. 3 and 3A; however, any circular or polygonal shape (e.g., squares, diamonds, triangles, etc.) is contemplated as being within the scope of this disclosure. Secondary cushioning elements 50 and 70 with other shapes, or configurations, are also within the scope of this disclosure (e.g., solid sheets; adhered, multi-component structures; etc.). Other materials may also be used to define each secondary cushioning element 50, 70, including, without limitation, other oil-extended block copolymers, foam rubber (e.g., natural latex, polyurethane, viscoelastic foams, etc.), and the like.

In some embodiments, the primary receptacle 80 may have a configuration that enables a consumer to place the primary cushioning element 100 within the primary receptacle 80 and to remove the primary cushioning element 100 from the primary receptacle 80. Such a primary receptacle 80 may be accessible through a primary opening 90 of the cover 20, thus enabling the insertion of a primary cushioning element 100 into the primary receptacle 80, as well as removal of the primary cushioning element 100 from the primary receptacle 80. In other embodiments, the primary cushioning element 100 may be permanently secured within the primary receptacle 80.

As shown in FIG. 1A, the cover 20 may, in some embodiments, include a pair of long edges 24 and 25 and a pair of short edges 26 and 27. As shown in FIG. 1B, the primary opening 90 that provides access to the primary receptacle 80 of the cover 20 may extend along an entire length of a short edge 26 of the cover 20. Alternatively, the primary opening 80 may run along a long edge 24 or a plurality of edges (including a corner) of the cover 20, which may provide for easy access to the primary receptacle 80 and, thus, enable a primary cushioning element 100 to be readily introduced into or removed from the primary receptacle 80 of the cover 20. In some embodiments, the primary opening 90 may be as expandable as the material that defines the primary opening 90 permits (e.g., by way of its elasticity or stretchability, etc.). A fastener 95 (e.g., a zipper, which may be visible or hidden under one or more flaps of material; buttons; VELCRO® fasteners; etc.) may be associated with the primary opening 90 to enable closure of the primary opening 90, as well as its reopening.

With continued reference to FIGS. 1, 1A, and 1B, the primary receptacle 80 may be inaccessible or even hidden when the primary opening 90 of the cover 20 is closed (e.g. zipped, fastened, folded over, etc.). The primary receptacle 80 may enable the secondary cushioning elements 50 and 70 of the first panel 40 and the second panel 60, respectively, to at least partially cover corresponding surfaces of the primary cushioning element 100. In some embodiments, the secondary cushioning elements 50 and 70 may extend over the full length and width of the primary cushioning element 100, providing an additional layer of cushioning over each surface 105 and 107, respectively, of the primary cushioning element 100.

The cover 20 may be rectangular, although any of a plurality of suitable shapes (e.g., regular polygons, irregular polygons, stars, round (e.g., circular, oval, elliptical, etc.) shapes, and other shapes) are also within the scope of this disclosure. In embodiments where the cover 20 has a rectangular shape, peripheral edges at three sides of the first panel 40 may be secured to peripheral edges at three corresponding sides of the second panel 60, while the corresponding peripheral edges at the fourth side of the first panel 40 and the fourth side of the second panel may define the primary opening 90 (FIG. 1B). The primary opening 90 may remain continuously open and/or be selectively closed (e.g., by way of fasteners that enable closure and re-opening (e.g., buttons, a zipper, etc.); etc.). The dimensions of the first panel 40 and the second panel 60 of such a cover 20 may vary, but may be about 20 inches (about 51 cm) by about 26 inches (about 66 nm), i.e., about the same as the dimensions of a standard size pillow case, or pillow cover, with a reasonable deviation. However, other dimensions are considered and contemplated for larger pillows (i.e. queen size pillows (20 in.×30 in., or about 51 cm×about 76 cm), king size pillows (20 in.×36 in, or about 51 cm×about 91 cm), euro pillows (26 in.×26 in., or about 66 cm×66 cm) and smaller pillows.

The primary cushioning element 100 may comprise any suitable cushioning element. In embodiments where the cushion 10 (FIGS. 1, 1A, and 1B) comprises a pillow, the primary cushioning element 100 may comprise a fill material, a pillow insert, or a standard pillow. In some embodiments, an individual may select a particular primary cushioning element 100 he or she would like to place within the primary receptacle 80 of the cover 20 to provide a customized cushion 10 that achieves a particular, or desired, cushioning effect.

FIG. 1 depicts a specific embodiment of a primary cushioning element 100. The primary cushioning element 100 may be formed from a compressible, resilient, foamed material. By way of non-limiting example, the primary cushioning element 100 may be formed from a foam rubber, such as a natural latex foam (e.g., Talalay latex foam, etc.), a polyurethane foam, or the like. An array of channels 102 may extend through a thickness of the primary cushioning element 100. The channels 102 may facilitate airflow through the primary cushioning element 100 and a cushion 10 of which the primary cushioning element 100 is a part. Alternatively, the primary cushioning element 100 may comprise a compressible, resilient, elastomeric material (e.g., the materials described by U.S. Pat. Nos. 5,994,450, 6,797,765, and 7,964,664, the entire disclosures of which are hereby incorporated herein by reference, etc.). The elastomeric material may define a plurality of thin interconnected walls that in turn define an array of cells or columns (e.g., the cushioning elements described by U.S. Pat. Nos. 5,749, 111 and 6,026,527 and by U.S. Patent Application Publication US 2018/0305199 A1, the entire disclosures of which are hereby incorporated herein, etc.).

In embodiments where the primary cushioning element 100 comprises a fill material, the fill material may comprise any material suitable for use as a cushion, such as a pillow (e.g., for use in cushioning an individual's head, back, leg(s), etc.). The fill material may be introduced directly into the primary receptacle 80 to define the primary cushioning element 100 of the cushion 10. Alternatively, the fill material may be contained in a separate cover that, along with the fill material, defines the primary cushioning element 100 (e.g., an existing pillow, etc.) prior to its placement in the primary receptacle 80.

Figure 2:
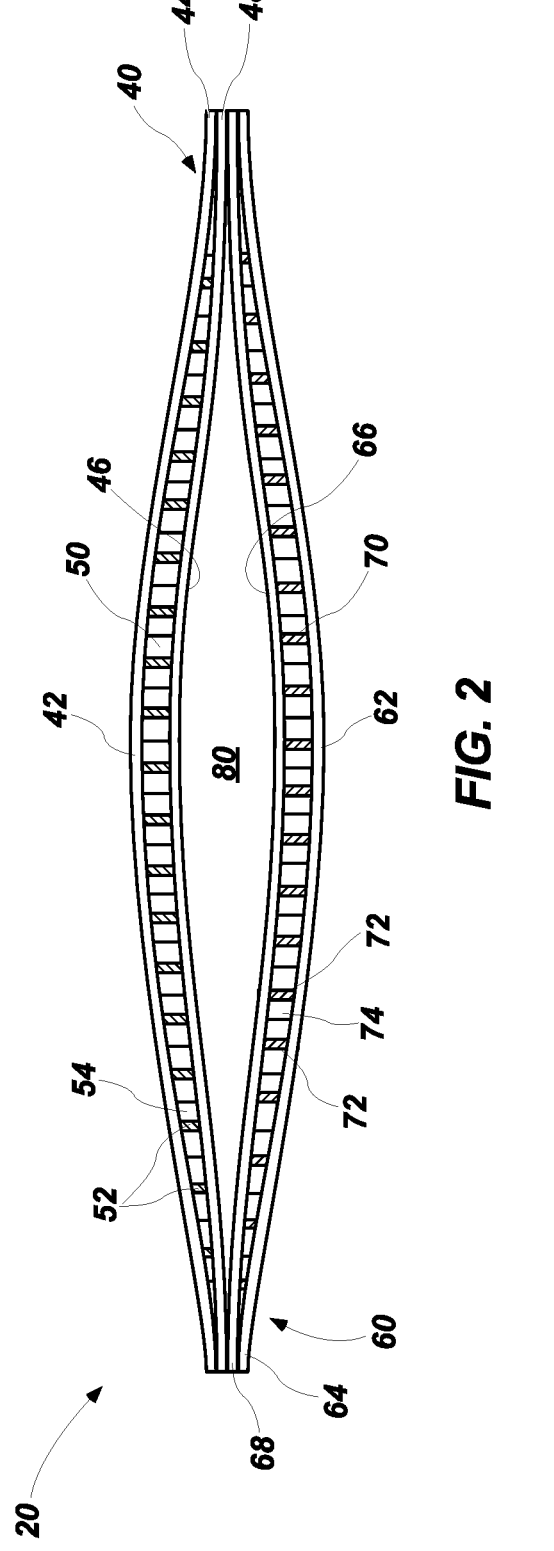
FIG. 2 is a cross-sectional representation of a variation of the cover of FIG. 1, in which secondary cushioning elements of a first panel of the cover and a second panel of the cover are offset relative to one another.

Turning now to FIG. 2, the first panel 40 and the second panel 60 of a specific embodiment of the cover 20 are illustrated in further detail. The first panel 40 may include an outer layer 42 and an inner layer 46. The outer layer 42 and the inner layer 46 may comprise thin layers that are secured to each other about their outer peripheries 44 and 48, respectively. As illustrated by FIG. 2, the outer peripheries 44 and 48 of the outer layer 42 and the inner layer 46, respectively, may be secured (e.g., with stitched threads, bonded, etc.) directly to each other. Alternatively, the outer peripheries 44 and 48 of the outer layer 42 and the inner layer 46, respectively, may be secured to corresponding edges of a gusset (not shown in FIG. 2), which indirectly secures the outer layer 42 and the inner layer 46 to one another.

The second panel 60 may likewise include an outer layer 62 and an inner layer 66. The outer layer 62 and the inner layer 66 may comprise thin layers that are secured to each other about their outer peripheries 64 and 68, respectively. As illustrated by FIG. 2, the outer peripheries 64 and 68 of the outer layer 62 and the inner layer 66, respectively, may be secured (e.g., with stitched threads, bonded, etc.) directly to each other. Alternatively, the outer layer 62 and the inner layer 66 may be indirectly secured to each other by securing their outer peripheries 64 and 68, respectively, to corresponding edges of a gusset (not shown in FIG. 2).

In some embodiments, the outer layers 42 and 62 and the inner layers 46 and 66 may be breathable, or air may flow through them. The outer layers 42 and 62 and the inner layers 46 and 66 may be formed from a flexible material, such as a fabric. The fabric may be capable of resiliently stretching (e.g., the fabric may include up to 10% spandex, or elastane, etc.). The fabric may comprise a moisture wicking material, which may provide a cooling effect when a body part is placed against it. Without limitation, the outer layers 42 and 62 may be formed from a stretchable nylon, which may include visible perforations therethrough (i.e., a nylon mesh), while the inner layers 46 and 66 may be formed from a fabric that is soft and lightly lofted, such as a cotton or cotton-polyester blend. Other examples of fabrics that may be used to define the outer layers 42 and 62 and the inner layers 46 and 66 include, but are not limited to, cotton fabrics, cotton blend fabrics, rayons, polyesters, other synthetic fabrics, and bamboo fabrics, to name only a few.

In the first panel 40 of the cover 20, a secondary cushioning element 50 may be positioned between the outer layer 42 and the inner layer 46. The second panel 60 of the cover 20 may likewise include a secondary cushioning element 70 positioned between the outer layer 62 and the inner layer 66 of the second panel 60. Each secondary cushioning element 50, 70 may comprise a compressible, resilient, elastomeric material that defines a plurality of thin interconnected walls 52, 72 that in turn defines an array of cells or columns 54, 74. The thin interconnected walls 52 and the array of cells or columns 54 of the secondary cushioning element 50 of the first panel 40 may be offset relative to the thin interconnected walls 72 and the array of cells or columns 74 of the secondary cushioning element 70 of the second panel 60.

As depicted by FIG. 3, each secondary cushioning element 50, 70 may include a larger profile center 56, 76 and smaller profile outer periphery 58, 78. The cushioning element 50, 70 may have longer, or taller, cells or columns 54, 74 at and around the center 56, 76 and shorter cells or columns 54, 74 at and adjacent to the outer periphery 58, 78. In some embodiments, an outer surface 51, 71 of the secondary cushioning element 50, 70 may taper gradually from the center 56, 76 or a central portion 57, 77 thereof down to the outer periphery 58, 78 thereof. Such a taper may be linear or curved. Stated another way, the lengths, or heights, of the cells or columns 54, 74 may form a gradient that decreases from the center 56, 76 toward the outer periphery 58, 78, or increases from the outer periphery 58, 78 toward the center 56, 76. Embodiments of such a cushion are illustrated by U.S. Design Patent Application Nos. 29/694,846 and 29/694,851, the entire disclosures of which are hereby incorporated herein. Such a configuration may enable the center 56, 76 or a central portion 57, 77 of the secondary cushioning element 50, 70 to provide greater support and cushioning than are provided by outer peripheral locations and the outer periphery 58, 78 of the secondary cushioning element 50, 70. By way of non-limiting example, the thickness of each secondary cushioning element 50, 70 at its center 56, 76 may be about one-half inch (about 1¼ cm) to about two inches (about 5 cm), while the thickness of each secondary cushioning element 50, 70 at its outer periphery 58, 78 may be about one-sixteenth inch (about 1.5875 mm) to about one inch (about 2.54 cm). In a more specific embodiment, the thickness of each secondary cushioning element 50, 70 at its center 56, 76 may be about one inch (about 2.54 cm), while the thickness of each secondary cushioning element 50, 70 at its outer periphery 58, 78 may be about one-eighth inch (about 3.175 mm), Such a secondary cushioning element 50, 70 may taper outward over a distance of about 5¾ inches (about 14.6 cm) from any location of the outer periphery 58, 78 toward the center 56, 76; thus, a central portion 57, 77 of the secondary cushioning element 50, 70 that has a substantially uniform thickness may be greater in length than in width, meaning the area of maximum thickness may have substantially the same shape as the secondary cushioning element 50, 70. Even with a standard sized pillow having dimensions of about 20 in.×26 in. (about 51 cm×about 66 cm), a central portion 57, 77 having a substantially uniform thickness would comprise majority of the area of the secondary cushioning element 50, 70.

With returned reference to FIG. 2, each secondary cushioning element 50, 70 may be secured to the corresponding inner layer 46, 66 of its corresponding panel (i.e., the first panel 40 or second panel 60, respectively). The secondary cushioning elements 50 and 70 may be manufactured concurrently by placing overlapping layers of a fabric, or scrim, between two sides of a mold and them molding each secondary cushioning element 50, 70 onto a corresponding scrim. Once the secondary cushioning elements 50 and 70 have been molded, each scrim may continue to adhere to its respective secondary cushioning element 50, 70 while each of the corresponding inner layer 46, 66 are removed from adhering to one another and, thus, may serve as an inner layer 46, 66 of a panel (i.e., first panel 40 and second panel 60, respectively) of the cover 20. Alternatively, the secondary cushioning element 50, 70 may be fixed to one or both of its respective outer layer 42, 62 and outer layer 46, 66 by any other suitable technique (e.g., heat and melting the elastomeric material, ultrasonic welding, gluing, stitching, etc.). Even further the first cushioning element 14 may be secured to the top panel 18 through similar means. It will be appreciated that an open knit or weave fabric may be utilized as the scrim or other portions of fabric to allow for breathability and air flow.

In some embodiments, such as that depicted by FIG. 2, the plurality of interconnected walls 52 and the array of cells or columns 54 of secondary cushioning element 50 may be laterally offset from the plurality of interconnected walls 72 and the array of cells or columns 74 of secondary cushioning element 70. Embodiments of such secondary cushioning elements are illustrated U.S. Design Patent Application Nos. 29/694,846 and 29/694,851.

FIG. 4 depicts an embodiment of cover 20' that may include many or all of the same features and elements as the embodiment of cover 20 shown in FIG. 2. The primary difference between cover 20' and cover 20 is that the plurality of interconnected walls 52' and the array of cells or columns 54' of the secondary cushioning element 50' of the first panel 40' of the cover 20' are substantially aligned with the plurality of interconnected walls 72' and the array of cells or columns 74', respectively, of the secondary cushioning element 70' of the second panel 60' of the cover 20'.

Figures 5, 6, 7:
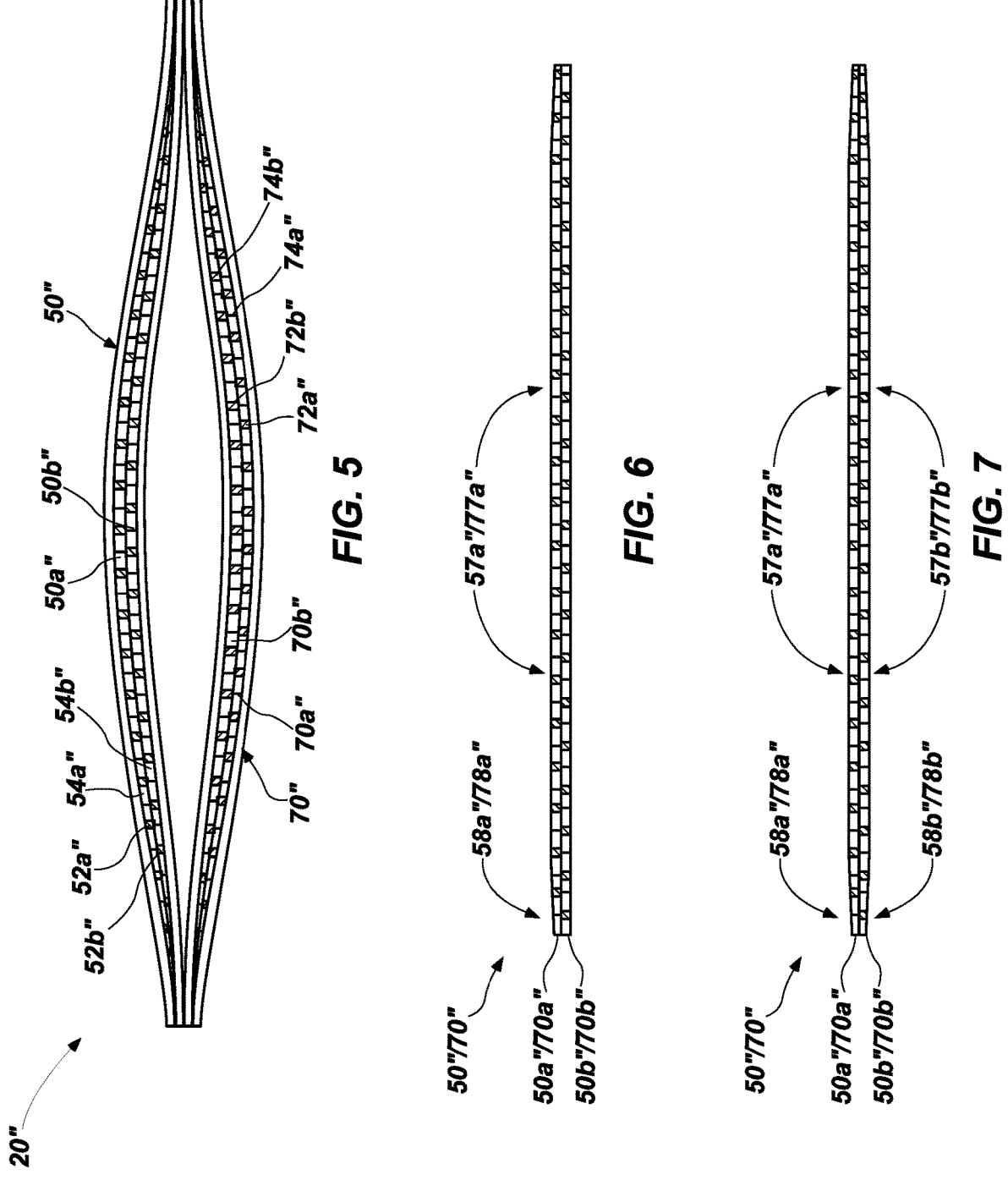
FIG. 5 is a cross-sectional representation of yet another variation of the cover of FIG. 1, in which the secondary cushioning element of each of a first panel of the cover and a second panel of the cover includes halves that define opposite surfaces of the secondary cushioning element and that have patterns that are offset relative to one another.
FIG. 6 is a cross-sectional representation of a first option for a secondary cushioning element of the variation of cover shown in FIG. 5, in which one half of the secondary cushioning element is thicker at its center than at its outer periphery, while the other half of the secondary cushioning element has a substantially uniform thickness.
FIG. 7 is a cross-sectional representation of a second option for a secondary cushioning element of the variation of cover shown in FIG. 5, in which both halves of the secondary cushioning element are thicker at their centers than at their outer peripheries.

FIG. 5 depicts an embodiment of cover 20" in which each secondary cushioning element 50", 70" includes a first half 50a", 70a" and a second half 50b", 70b". The halves 50a" and 50b", 70a" and 70b" define opposite surfaces of the secondary cushioning element 50", 70". The first half 50a", 70a" comprises a compressible, resilient elastomeric material defining that defines a plurality of thin interconnected walls 52a", 72a" that in turn define an array of cells or columns 54a", 74a" and a second half 50b", 70b". The second half 50b", 70b" also comprises a compressible, resilient elastomeric material that defines another plurality of thin interconnected walls 52b", 72b" that in turn define another array of cells or columns 54b", 74b". The first half 50a", 70a" and the second half 50b", 70b" have patterns that are offset relative to one another. More specifically, the plurality of thin interconnected walls 52a", 72a" of the first half 50a", 70a" may be laterally offset from the other plurality thin interconnected walls 52b", 72b" of the second half 50b", 70b" and, thus, the array of cells or columns 54a", 74a" of the first half 50a", 70a" may be laterally offset from the other array of cells of columns 54b", 74b" of the second half 50b", 70b", as illustrated by FIG. 5, as well as by FIG. 3A and by U.S. Design Patent Application Nos. 29/694,846 and 29/694,851. Alternatively, the plurality of thin interconnected walls 52a", 72a" and the array of cells or columns 54a", 74a" of the first half 50a", 70a" may be aligned with the other plurality thin interconnected walls 52b", 72b" and the other array of cells of columns 54b", 74b" of the second half 50b", 70b".

FIG. 6 shows an example of a secondary cushioning element 50", 70" in which a first half 50a", 70a" has a variable thickness from its central locations 57a", 77a" to its outer periphery 58a", 78a", such as the taper described previously herein in reference to FIG. 3. The second half 50b", 70b" of such a secondary cushioning element 50", 70" may have a substantially uniform thickness across an entirety of the area the second half 50b", 70b" occupies.

FIG. 7 shows another example of a secondary cushioning element 50", 70" in which a first half 50a", 70a" has a variable thickness from its central locations 57a", 77a" to its outer periphery 58a", 78a", such as the taper described previously herein in reference to FIG. 3. The second half 50b", 70b" of such a secondary cushioning element 50", 70" may also have a variable thickness from its central locations 57b", 77b" to its outer periphery 58b", 78b". Thus, both halves 50a" and 50b", 70a" and 70b" of each secondary cushioning element 50", 70" of the cover 20" may be thicker at their centers than at their outer peripheries.

Secondary cushioning elements 50" and 70" with offset arrangements such as those depicted by FIGS. 5-7 may provide greater support than other embodiments of secondary cushioning elements, while enabling air to flow through the secondary cushioning element 50", 70". A fabric, or scrim, may be molded in place between the first half 50a", 70a" and the second half 50b", 70b" of each secondary cushioning element 50", 70", which may secure the halves 50a" and 50b", 70a" and 70b" to their respective scrim. The scrim may comprise a single, complete piece of fabric that extends through the thickness of the secondary cushioning element 50", 70" across an entirety of the area occupied by the secondary cushioning element 50", 70". The scrim may be perforated, cut, or modified to enhance the breathability, support, and/or stability of the secondary cushioning element 50", 70". The scrim may also have an effect on the cushioning characteristics of the secondary cushioning element 50", 70"; for example, the stretchability and resilience of the scrim may contribute to the feel of the secondary cushioning element 50", 70" across its outer surface.

Figures 8, 9:
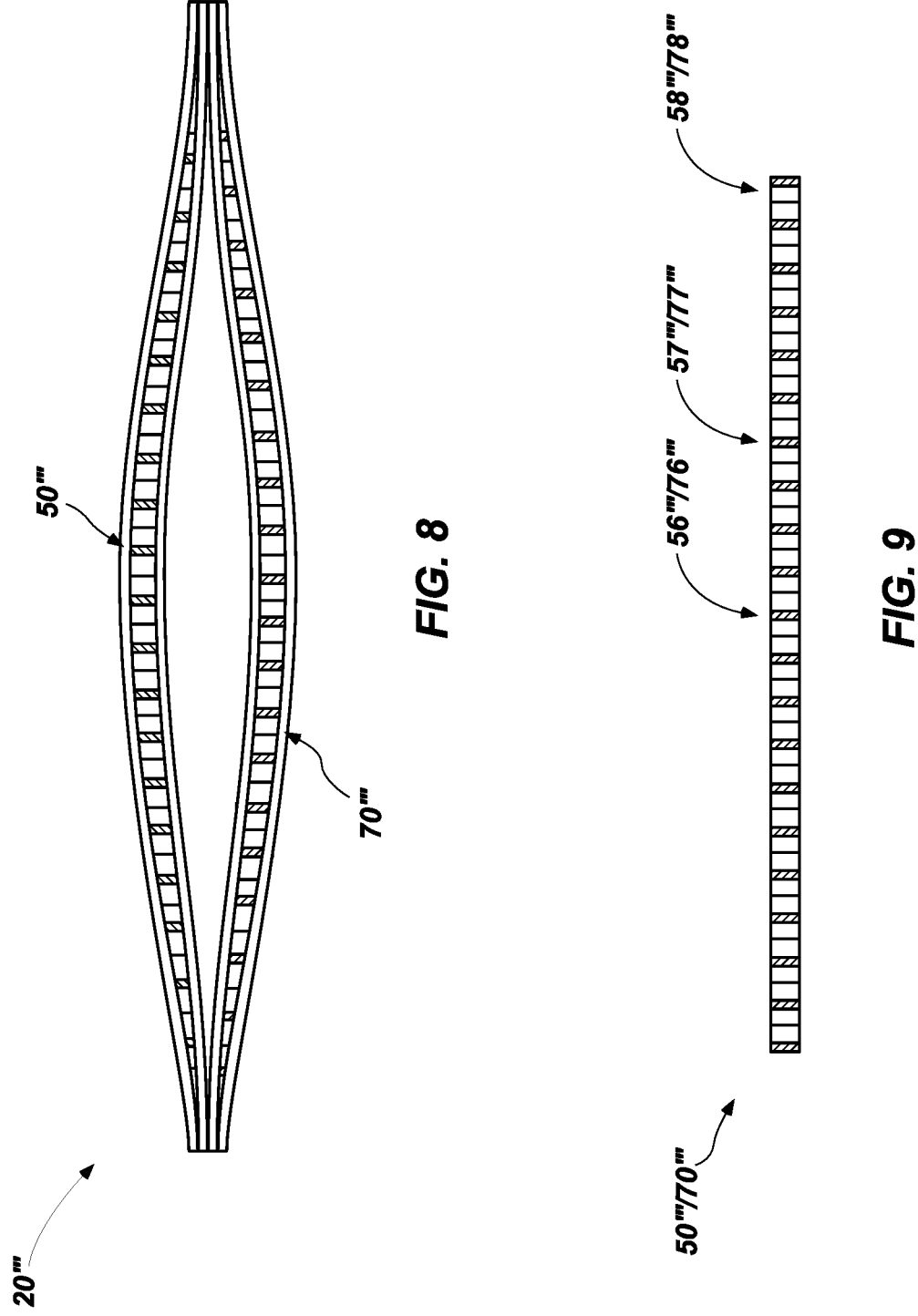
FIG. 8 is a cross-sectional representation of still another variation of the cover of FIG. 1, in which the secondary cushioning elements a first panel of the cover and a second panel of the cover have substantially uniform thicknesses.
FIG. 9 is a cross-sectional representation of a secondary cushioning element of a panel of the variation of cover shown in FIG. 8.

Other than the configurations of its secondary cushioning elements 50''' and 70''', the embodiment of cover 20''' depicted by FIG. 8 may include many or all of the same elements and features of the embodiment of cover 20 depicted by FIG. 2, the embodiment of cover 20' depicted by FIG. 4, and the embodiment of cover 20" depicted by FIG. 5. With added reference to FIG. 9, each secondary cushioning element 50''', 70''' of cover 20''' may have a substantially uniform thickness across an entirety of the area it occupies; i.e., from its center 56''', 76''', across its central locations 57''', 77''', to its outer periphery 58''', 78'''.

Figure 10:
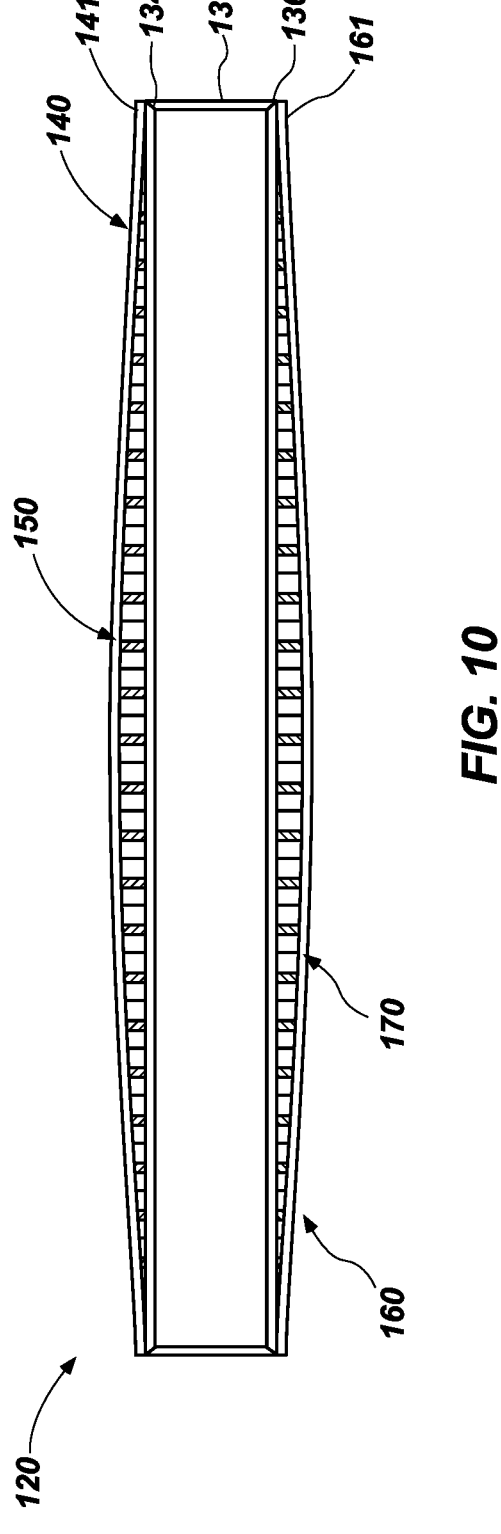
FIG. 10 is a cross-sectional representation of another embodiment of a cover for a cushion according to this disclosure, in which a first panel and a second panel are secured to one another, but spaced apart from each other, by way of a peripheral gusset.

FIG. 10 provides a cross-sectional representation of another embodiment of a cover 120 for a cushion according to this disclosure, in which a first panel 140 that includes a secondary cushioning element 150 and a second panel 140 that includes a secondary cushioning element 170 are secured to one another, but spaced apart from each other, by way of a peripheral gusset 130. The peripheral gusset 130 may comprise an elongated flexible element (e.g., a strip of a breathable material, a strip of fabric, etc.) with a first edge 134 along a length of the peripheral gusset 130 and a second edge 136 along the length of the peripheral gusset 130. The first edge 134 and the second edge 136 may be opposite from each other. The first edge 134 of the peripheral gusset 130 may be secured to an outer peripheral edge 141 of the first panel 140, while the second edge 136 of the peripheral gusset 130 may be secured to an outer peripheral edge 161 of the second panel 160.

The peripheral gusset 30 may carry at least a portion of a fastener (not shown in FIG. 10) to provide selective access to a primary opening 90 (FIG. 1B) of the cover 120.

Although FIGS. 4, 5, 8, and 10 respectively illustrate embodiments of covers 20', 20", 20''', and 120 with secondary cushioning elements 50' and 70', 50" and 70", 50''' and 70''', and 150 and 170 that are substantially the same as one another or identical to one another, embodiments of covers 20 that include combinations of different cushioning elements 50 and 70 are also within the scope of this disclosure, as illustrated to only a limited extent in FIG. 2. The use cushioning elements 50 and 70 that differ in softness, thickness, materials, or other properties may provide an individual using the cover 20 on a primary cushioning element 10 with the ability to experience different cushioning effects with the same cushion 10 (FIGS. 1, 1A, and 1B).

Figure 11:
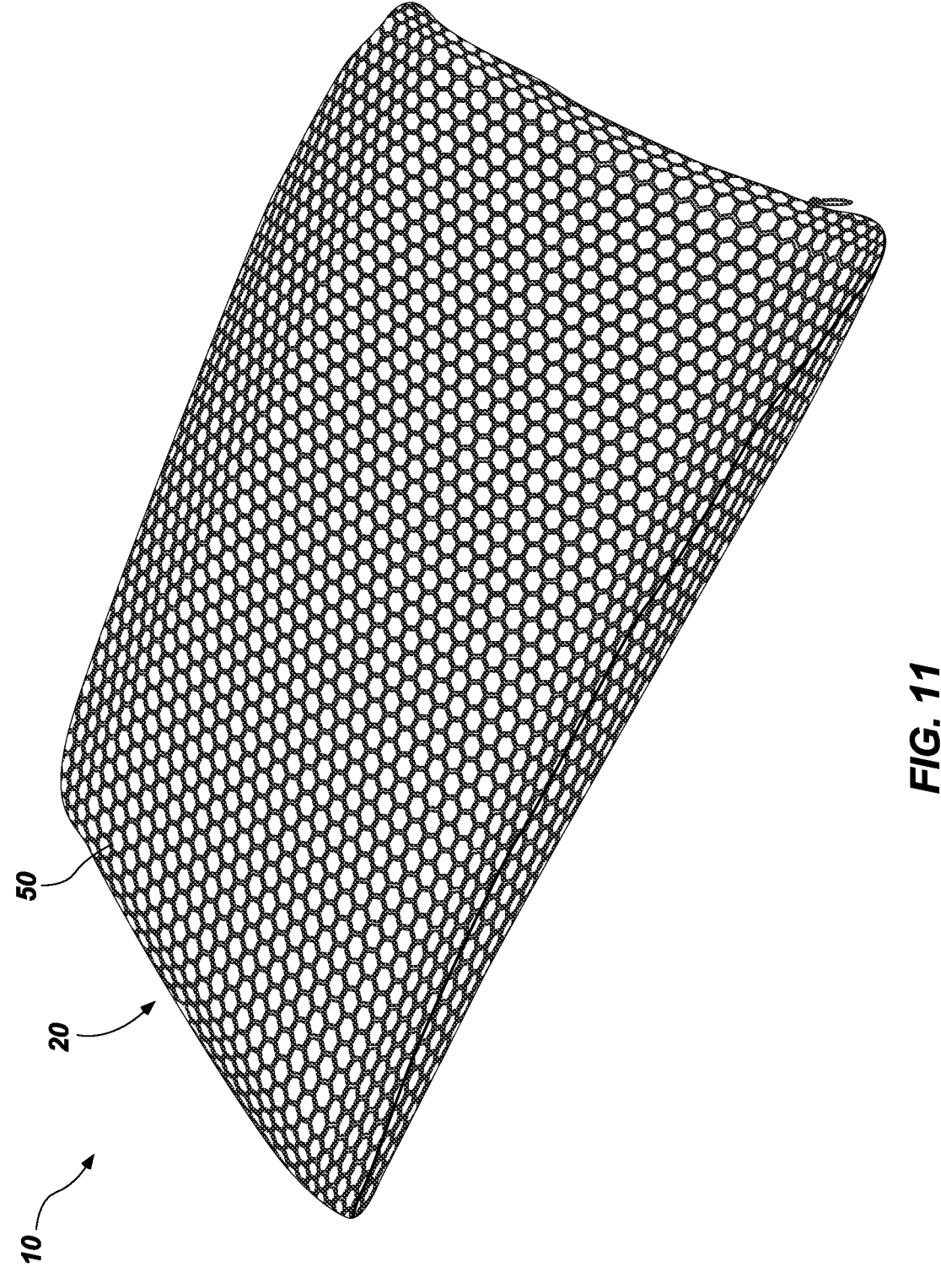
FIG. 11 is a perspective view of an embodiment of a cushion with a cover according to this disclosure.

FIG. 11 shows an embodiment of an assembled cushion 10 that includes any embodiment of cover 20 according to this disclosure, with a secondary cushioning element 50 being somewhat visible through the cover 20.

Figure 12:
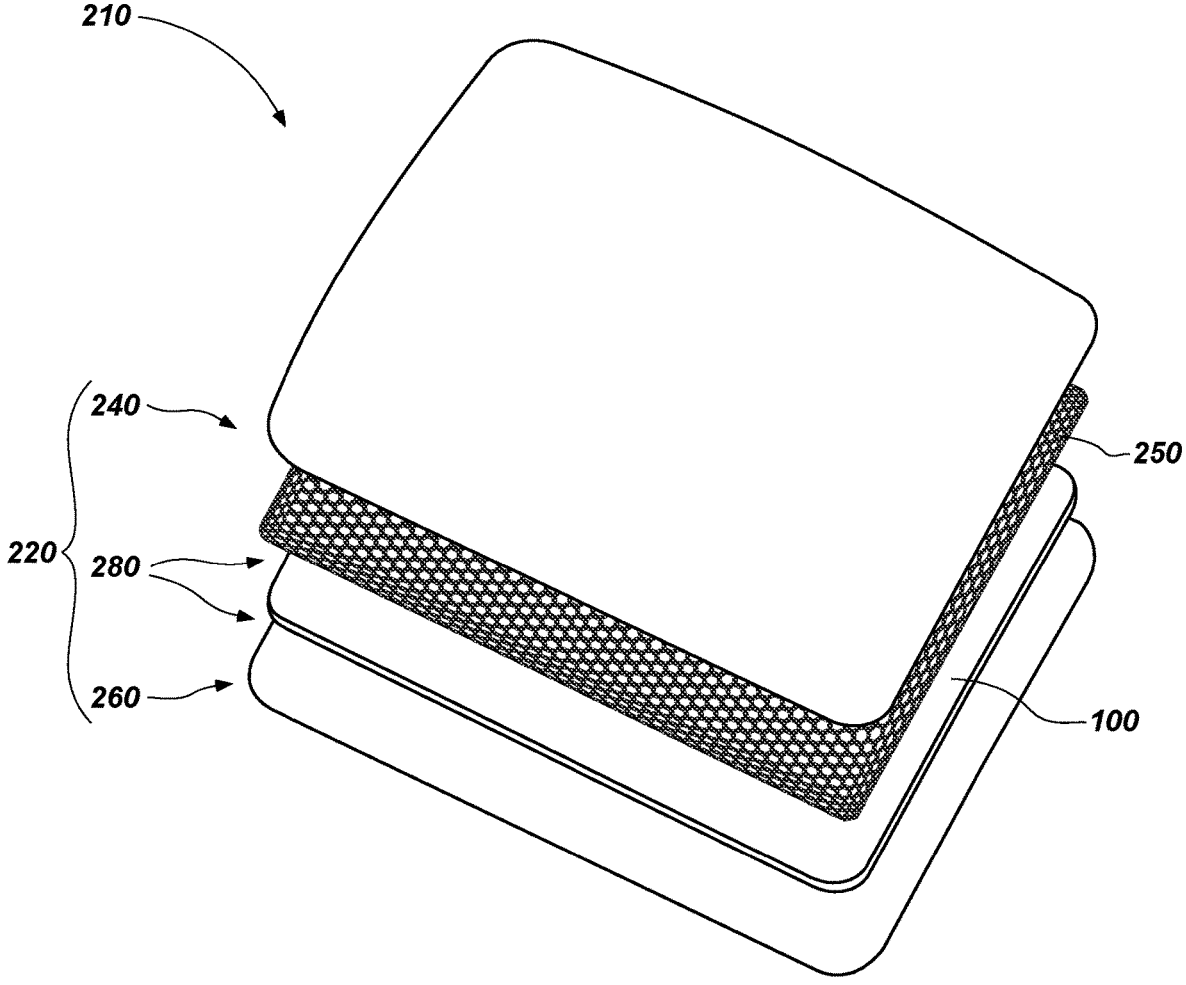
FIG. 12 is an alternate embodiment of a pillow or pillow cover with a top panel, a bottom panel, a cushion insert and a first cushion element.

Referring to FIG. 12, another embodiment of a cushion 210 is illustrated. The cover 220 of the cushion includes a first panel 240 and a second panel 260 with a primary receptacle 280 therebetween. Only the first panel 240 of the cover 220 includes a secondary cushioning element 250. The first panel 240 and its secondary cushioning element may be configured in any suitable manner, including those described previously herein. The second panel 260 may comprise one or more layers of a flexible material, such as a fabric (e.g., a breathable fabric, a moisture wicking fabric, etc.). The primary receptacle 280 may receive a primary cushioning element 100.

While the embodiment of cushions described herein include primary receptacles that may removably receive primary cushioning elements, closed systems that include a cover according to this disclosure and a primary cushioning element permanently secured therein and, thus, lacking modularity are also contemplated as being within the scope of this disclosure.

Although the foregoing description contains many specifics, these should not be construed as limiting the scopes of the inventions recited by any of the appended claims, but merely as providing information pertinent to some specific embodiments that may fall within the scopes of the appended claims. Features from different embodiments may be employed in combination. In addition, other embodiments may also lie within the scopes of the appended claims. All additions to, deletions from and modifications of the disclosed subject matter that fall within the scopes of the claims are to be embraced by the claims.

What is claimed:

1. A method for forming a cushioning element in a single molding step, the single molding step comprising:
   placing overlapping layers of fabric between two parts of a mold with at least one mold cavity of the mold on each side of the overlapping layers of fabric, the overlapping layers of fabric comprising a first fabric coupled with a second fabric;
   with the two parts of the mold, concurrently molding a first cushioning element on the first fabric and molding a second cushioning element on the second fabric; and
   separating portions of the first fabric and the second fabric to thereby form a primary receptacle.

2. The method of claim 1, wherein placing the overlapping layers of fabric between the two parts of the mold comprises placing a scrim comprising cotton between the two parts of the mold.

3. The method of claim 1, wherein material of the first cushioning element extends through the first fabric to secure the first cushioning element to the first fabric.

4. The method of claim 1, wherein molding the first cushioning element comprises molding the first cushioning element from a compressible, resilient elastomeric material.

5. The method of claim 4, wherein molding the first cushioning element comprises molding a plurality of interconnected walls defining an array of cells.

6. The method of claim 4, wherein molding the second cushioning element comprises molding the second cushioning element from a compressible, resilient elastomeric material.

7. The method of claim 6, wherein:
   molding the first cushioning element comprises molding a first plurality of interconnected walls defining a first array of cells; and
   molding the second cushioning element comprises molding a second plurality of interconnected walls defining a second array of cells.

8. The method of claim 7, wherein molding the first plurality of interconnected walls and molding the second plurality of interconnected walls comprising molding the first plurality of interconnected walls and the second plurality of interconnected walls to be completely superimposed with each other.

9. A method for forming a cushioning element in a single molding step, the single molding step comprising:

placing overlapping layers of fabric between two parts of a mold, the overlapping layers of fabric comprising a first fabric coupled with a second fabric;
   with the two parts of the mold, concurrently molding a first cushioning element on the first fabric of the overlapping layers of fabric and molding a second cushioning element on the second fabric of the overlapping layers of fabric; and
   separating portions of the first fabric and the second fabric to form a primary receptacle.

10. The method of claim 9, wherein molding the first cushioning element comprises molding an elastomeric material to define a first plurality of interconnected walls onto the first fabric, the first plurality of interconnected walls defining a first array of cells of the first cushioning element.

11. The method of claim 10, wherein molding the elastomeric material defines walls at a periphery of the first plurality of interconnected walls with heights of about one-eighth inch.

12. The method of claim 10, wherein molding the elastomeric material defines walls at a periphery of the first plurality of interconnected walls with heights of about one sixteenth inch.

13. The method of claim 10, wherein a periphery of the first plurality of interconnected walls is shorter than a center of the first plurality of interconnected walls.

14. The method of claim 10, wherein molding the elastomeric material comprises molding the elastomeric material onto a scrim.

15. The method of claim 9, wherein
   subsequent to separating the portions of the first fabric and the second fabric, the first cushioning element remains adhered to the first fabric and the second cushioning element remains adhered to the second fabric.

16. A method for forming a cushion in a single molding step, the single molding step comprising:
   concurrently molding a first cushioning element onto a first fabric of overlapping layers of fabric and a second cushioning element onto a second fabric of the overlapping layers of fabric; and
   separating portions of the first fabric and the second fabric to form a primary receptacle,
   wherein the first cushioning element is formed of an elastomeric material defining a plurality of interconnected walls on the first fabric, the plurality of interconnected walls being compressible and resilient, defining an array of cells, and having heights of about a half an inch or less, the first fabric remaining adhered to bases of the plurality of interconnected walls.

17. The method of claim 16, wherein the elastomeric material defines walls at a periphery of the plurality of interconnected walls with heights of about one-eighth inch.

18. The method of claim 16, wherein the elastomeric material defines walls at a periphery of the plurality of interconnected walls with heights of about one sixteenth inch.

19. The method of claim 16, wherein a periphery of the plurality of interconnected walls is shorter than a center of the plurality of interconnected walls.

20. The method of claim 16, wherein molding the first cushioning element comprises molding the elastomeric material onto a scrim.

21. The method of claim 16, further comprising:
   placing the overlapping layers of fabric between two sides of a mold, wherein molding the first cushioning element and the second cushioning element comprises molding elastomeric material to define pluralities of interconnected walls onto the first fabric and the second fabric of the overlapping layers of fabric, each plurality of interconnected walls defining an array of cells.

22. The method of claim 21, wherein subsequent to separating the portions of the first fabric and the second fabric, each plurality of interconnected walls remains adhered to its corresponding layer of fabric.

\*  \*  \*  \*  \*